April 16, 1968   C. L. NOTTEBÖHM ETAL   3,378,398
SELF-SUSTAINING HIGHLY POROUS REGENERABLE
THERMOPLASTIC FIBER MAT
Filed March 6, 1963

INVENTORS
CARL LUDWIG NOTTEBOHM
ROBERT SCHABERT
ALBRECHT BURK
BY *Burgess, Dinklage + Sprung*
ATTORNEYS.

United States Patent Office
3,378,398
Patented Apr. 16, 1968

3,378,398
SELF-SUSTAINING HIGHLY POROUS REGEN-
ERABLE THERMOPLASTIC FIBER MAT
Carl Ludwig Nottebohm, Robert Schabert, and Albrecht Burk, Weinheim an der Bergstrasse, Germany, assignors to Carl Freudenberg Kommanditgesellschaft auf Aktien, Weinheim an der Bergstrasse, Germany, a corporation of Germany
Continuation-in-part of application Ser. No. 172,712, Feb. 12, 1962. This application Mar. 6, 1963, Ser. No. 263,347
Claims priority, application Germany, Sept. 25, 1956, F 21,305
6 Claims. (Cl. 117—140)

This application is a continuation-in-part of application Ser. No. 172,712, filed Feb. 12, 1962 and now abandoned, which represents a division of United States application Ser. No. 836,301, filed Aug. 26, 1959, issued patent No. 3,035,943, which, in turn, is a continuation-in-part of application Ser. No. 685,859, filed Sept. 24, 1957 and now abandoned.

This invention relates to a regenerable fiber mat suitable for the filtration of gases, scouring operations, paint and wax stripping operations and abrasive operations.

Non-regenerable fiber mats suitable for the filtration of gases, scouring operations, paint and wax stripping operations, and abrasive operations are described and claimed in several patents. These fiber mats, however, have certain disadvantages. First of all, they offer too much resistance to the passage of air which is particularly objectionable to their use as filters. There exists no uniformly bonded fiber mats having an air permeability which is less than 5 mm. water column at a speed of the streaming air of 1.5 meters per second. This value which should be substantially maintained even after prolonged use is the lower limit which is required for most technical purposes, e.g., for the application in the air tunnels in automobiles.

Another disadvantage of these known fiber mats is their relatively high specific weight and their low resistance against compressing forces so that they do not impart a sufficient abrasive, scouring or stripping action. In most fibrous mats, the individual fibers are not or only to a very small extent bonded together in the interior of the fiber mat so that they are difficult to clean after use. They need facing sheets on the opposite surfaces or relatively large amounts of an adhesive must be sprayed on one or both surfaces of such non-woven fiber mats in order to effect a strong bonding of those fibers to one upon another which are present in the surface areas. Although said fiber mats containing loose aggregated fibers in the interior of the non-woven structures can be made self-sustaining by the application of facing sheets or relatively large amounts of an adhesive to one or both surfaces; it is self-explanatory that just for that very reason, the air permeability decreases, since a large area of the surface will be blocked by impervious materials.

It is further obvious that the air permeability sharply decreases after dust particles have deposited on those spots which were still free for the passage of air. Thus, the mat will be clogged long before an appreciable amount of dust particles has penetrated into the interior of the fiber mat. For this reason, it is practically senseless to make thick non-woven fiber mats in an attempt to improve the filtering effect or the dust absorption capacity. Further it is practically senseless to make thick non-woven fiber mats in an attempt to improve the scouring, abrasive, stripping, etc, effect since the extreme resulting depth has the disadvantage that debritus from the floor, articles, etc., being cleaned (scoured, stripped) passes throughout the interior of the mat and is discharged outwardy from the mat edges necessitating additional clean-up operations.

It is interesting to note that all the known methods for the production of fiber mats from non-woven fabrics of open filamentary structure which is necessary for the free passage of air, carefully avoid impregnation of the starting materials, i.e., the unwoven unfelted skeleton framework, under pressure. On the contrary, prior art methods in most cases spray an adhesive on the surface of said skeleton framework of fibers. As previously stated, the droplets of the adhesive deposit preferably on the fibers of the outer parts of the fiber fleece. Only a very small percentage of the adhesive, if at all, will penetrate to the inner parts. The thus resulting porous structure is therefore of different stability in its various parts. But once the surface cover is damaged, the whole fiber mat has to be discarded since the fibers of the inner part of the fiber structure are released. Needless to say such fiber mats cannot be regenerated by washing with water.

The last-mentioned disadvantage may of course be overcome by impregnating the porous skeleton framework of fibers in random direction with a liquid adhesive under pressure, for example, by passing the impregnated fiber web through a pair of rollers, as described in the Patent No. 2,774,687 to Nottebohm, et al. Under these conditions, however, the open porous skeleton framework structure of the dry starting web is entirely destroyed. Only sheet material similar to textile or leather of a maximum thickness of 2.5 mm. may be obtained. Said products are distinguished by valuable properties, such as softness, porosity, elasticity, springiness, crease-resistance, water resistance, and fastness against washing and cleaning. Although they may filter the air from dust particles, they cannot be employed as gas filters under the conditions of practice, since their permeability is too low. Thus, in order to pass air through that leather-like sheet at a velocity of 1.5 meters per second, a minimum pressure difference of 100 mm. water column is necessary. Also their dust, grit, dirt, etc., storing capacity is poor.

Any of the prior art references in this field recommends the application of aqueous rubber latex or aqueous adhesives to which a wetting agent such as sodium benzene-sulphonate has been added. Although said methods allow a complete through impregnation and in consequence thereof, a uniform bonding throughout the entire fleece, the open porous skeleton structure of the dry fiber fleece cannot be maintained during the impregnation step. After a complete impregnation in the presence of wetting agents and under pressure, the thickness of the impregnated fiber fleece is only about 1 to 5 percent or even less of the original, dry fiber fleece. Those skilled in the art call this phenomena collapsing of the fleece.

The only way to prevent collapsing of the skeleton structure of the dry fiber fleece consisted in spraying the adhesive on the dry fleece without subjecting it to pressure. The disadvantages of said method have been previously stated.

It is now one object of this invention to make highly porous, self-supporting stable, substantially non-compressible fiber mats which may be regenerated by washing with water.

Still another object of the invention is to provide a process whereby the skeleton structure of a dry fiber fleece is substantially maintained during the step of a thorough impregnation with a liquid adhesive under pressure.

A still further object of the invention is the production of regenerable fiber mats suitable for the filtration of gases in which any fiber is bonded to the neighboring fiber with the same strength, thereby substantially maintaining the skeleton structure of the dry fiber fleece and the high air permeability even after prolonged use.

A still further object of the invention is the production of fiber mats suitable for the filtration of gases, the thickness of which after impregnation under pressure is at least 30 percent of the thickness of the starting dry fiber fleece, and the specific weight of which is about 0.007 to 0.05.

A still further object of the invention is the production of fiber mats suitable for scouring, stripping, and abrasive operations as encountered in both domestic and commercial use, the thickness of which after impregnation under pressure is at least 30 percent of the thickness of the starting dry fiber fleece, and the specific weight of which is about 0.007 to 0.05.

The above and related objects will appear more clearly from the following description of typical ways and means of obtaining the objectives referred to, which description has reference to the appended drawings wherein.

Figure 1:
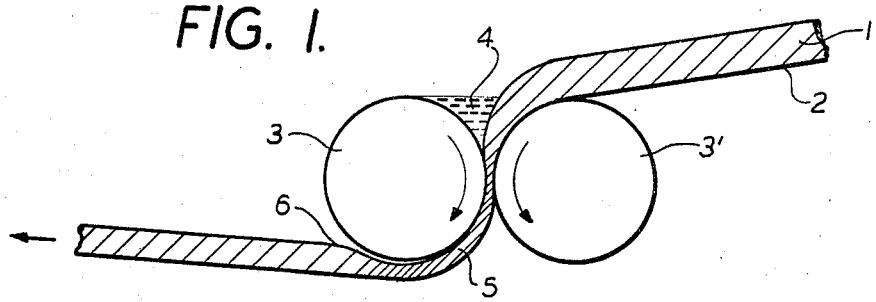
FIGS. 1 and 2 are explanative and show preferred embodiments of the impregnation step.

In accordance with the present invention, we have found that if a special combination of solvents and adhesives is used for the impregnating of a dry fiber fleece, the skeleton structure of said fleece may be substantially maintained even during a through impregnation under pressure.

The left column of the following table shows suitable adhesives that may be dissolved in any of the solvents or mixtures thereof listed in the right column.

| Adhesive: | Solvent |
| --- | --- |
| Polyamide | Butylalcohol. |
| Hexamethylolmelamine | Methylalcohol. |
| Triphenylmethanetriisocyanate 4,4',4" | Benzene. |
| Diisocyanates, e.g., O=C=N—C$_6$H$_5$—CH$_2$— C$_6$H$_5$—N=C=O | Methylenechloride. Trichloroethylene. Acetone. |
| Urea - formaldehyde condensation products, e.g., "Piastopal" [1] | Acetic acid ester. |

[1] Plastopal is a precondensate of urea and formaldehyde which is etherified with butanol.

The solution made by dissolving one or more of the above-mentioned adhesives in any of said solvents or mixtures thereof should contain between 8 and 70%, preferably 35 to 55% of said adhesives. It is also possible to replace part of the costly solvents or solvent mixtures by water. However, care must be taken to avoid the addition of too much water since solutions containing little more than a definite amount of water cause the collapse of the skeleton structure of the dry fiber fleece. Although there is a very sharp limit for each solvent or solvent mixture, it is not possible to state in general terms that amount of water which is maximal permissible in said solvents or mixtures thereof, since said value is different in each specific case.

It can be said, however, that none of the above-mentioned solvents or solvent mixtures may contain more than 50 percent of water. Furthermore, only such water-containing solvent combination can be used that form a homogeneous liquid and in which no wetting agents are present.

The starting material for the production of the novel fiber mats consists of a batt of cardable fibers. The fibers include fibers of vegetable origin, such as cotton ramie, flaked bast, fibers of animal origin, such as sheep wool, synthetic fibers, such as viscose rayon, copper rayon, acetate rayon, polyamides, polyvinylchlorides, polyvinylidene chlorides, polyacrylonitriles, polyvinyl alcohols, polyethylenes, polyesters, among these also synthetic protein fibers, e.g., Merinova, Ardil, Vikare [2], or fibers produced from copolymerizates; included furthermore are mixtures of these fibers among themselves and with other fibers. Cardable fibers, i.e., those having a length of at least 4 mm. are first formed into a loose fleece in which the fibers are randomly arranged in intersecting directions, i.e., polyposed. This loose fleece should have a thickness of at least greater than 12 mm., and preferably at least 25 mm., and may be produced in any conventional or known manner. This fleece may be produced, for example, by forming thin, carded layers or webs of the fabric on a conventional carding machine, and laying the webs one across the other, so that the direction of the fibers crisscross each other, in intersecting directions. The fleece may also be produced in any other known manner, as for example, by means of the random web process.

Figure 2:
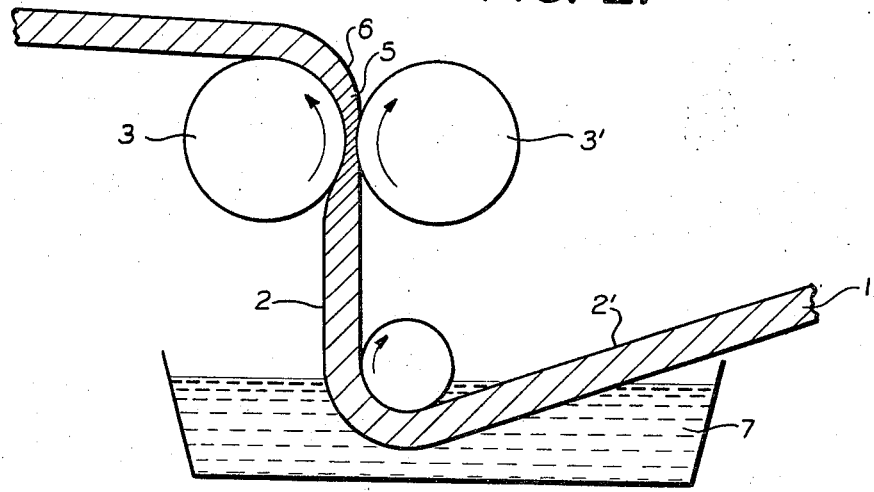

Prior to the impregnation and compression as shown in FIGURES 1 and 2, it has been found preferable to prestabilize one or both surfaces of the fleece. This may be done, for example, by applying a small quantity of the bonding agents to the surface or surfaces to be stabilized, as for example, by spraying or brushing, and by setting this bonding agent in the conventional manner to provide for the prestabilization. The application of the bonding agent for the prestabilization should be effected in such a manner that the inter-spaces between the fibers of the surface layers are preserved and are not filled by the bonding agent. The amount of the bonding agent necessary for the prestabilization is about 10 percent of the total amount. After application of the prestabilization layer (e.g., by foaming, spraying) follows a drying step which may be performed according to conventional methods, e.g., by passing the thus treated fleece through a drying device. Other methods for the prestabilization are described in Example 3.

Referring to FIG. 1 of the drawing, the thick fleece 1, produced in the manner described above, which is prestabilized on its surface 2 in the manner described above, is passed through the nip of the roller pair 3, 3'. The space above the nip between the rollers is filled with the impregnating agent 4 which uniformly impregnates the fleece 1 before and during its passage through the roller nip. The impregnated fleece 5 leaves the roller nip in a strongly compressed state, but expands and bulges out at 6 to a volume which is at least one-third of the thickness of the starting fleece. The expanded fleece structure is then conducted through a drying chamber (not shown), in which the volume and structure are fixed and stabilized by a setting of the bonding agent in the impregnation liquid.

In the embodiment shown in FIG. 2, the fleece 1, prepared as described above, has both surfaces 2, 2' prestabilized in the manner described above, by treatment with small quantities of the bonding agents while preserving the interstices between the fibers. The fleece is then conducted through an impregnating bath 7, in which it is uniformly wetted by the impregnating agent. From the impregnating bath, the fleece is guided vertically upward through the nip of the rollers 3, 3'. Upon passing through the roller nip, the impregnated fleece is freed from excess impregnating agents by the squeezing action and compressed. The strongly compressed fleece which emerges at 6, expands and bulges out again on its way to the drying chamber where it is fixed and stabilized by drying.

Figure 3:
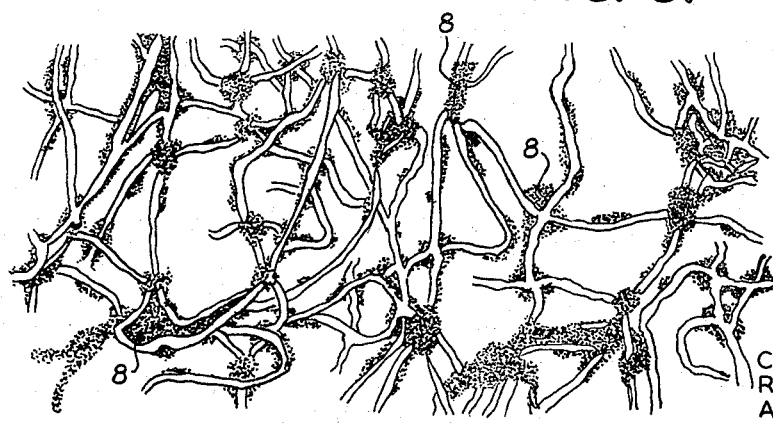
FIG. 3 is an enlarged detail view illustrating the three dimension random arrangement of the fibers after having passed the squeezing rollers 3, 3' and a heating zone (not shown).

FIGURE 3 is an enlarged detail view of the fiber mat made according to the above-described method. The adhesive 8 deposits in the form of droplets in hap-hazard manner, preferably, however, at the intersection of the two fibers, thus cementing them together. It should be emphasized that said detail view may be obtained by enlarging any section of the fiber mat, since there is a uniform bonding throughout the entire mat. The amount of adhesive incorporated into the fiber mat neither improves nor deteriorates the filtering, scouring, stripping, and/or abrasive capacity of the final fiber mat. The adhesive is only necessary to stabilize the open skeleton structure of

[2] Merinova is a synthetic casein fiber (see "Textile Fiber from Casein," R. F. Peterson, et al., Industrial & Engineering Chemistry, vol. 37, 1945, p. 492). Ardil is a wool-like fiber made from peanut protein. Ardil is the registered trade name of Imperial Chemical Industries. Vikare is a protein fiber.

the originally dry fiber fleece in which the individual fibers are loosely aggregated. It is not the purpose of the invention to incorporate a certain amount of an adhesive into a fiber fleece but to incorporate an adhesive under such conditions that the open porous skeleton structure of the dry fiber fleece and its outstanding filtering, scouring, stripping, etc., characteristics are substantially maintained during the impregnation with an adhesive. Although it is impossible to fully maintain the thickness of the dry fiber fleece during the above-described impregnation under pressure, our method provides a considerable improvement in this respect since the thickness after impregnation still amounts to at least 30% of the original thickness of the starting fiber fleece, whereas the thickness of any fiber fleece impregnated by any other method is about 1 to 5% of the dry fiber fleece, thus furnishing structures the porosity of which is too low for filter purposes.

EXAMPLE 1

A fiber fleece or web, prepared by means of carding, consisting of 300 grams per square meter polyamide fibers of 60 mm. staple length and 15 denier having a web thickness of 50 mm. and a specific gravity of 0.006, was coated uniformly on one side with the use of a doctor blade with a foam mixture consisting of a copolymer of polyvinyl chloride acetate of the following composition:

| Composition | Solid | Liquid |
| --- | --- | --- |
| Aqueous emulsion containing 50% of a copolymerizate of equal parts of polyvinyl-chloride and polyvinyl acetate, parts by weight | 50 | 100 |
| Water, parts by weight | | 795 |
| Sodiumbenzene-sulphonate, aqueous solution, parts by weight | 3.7 | 5 |
| | 53.7 | 900 | and then dried. The increase in weight of the fiber web as a result of this process was 3%, i.e., the total weight of the prestabilized web amounts to 309 grams. The thickness of the web was reduced to 36 mm.

This fiber web which had been prestabilized on one side was then thoroughly impregnated with a solution of a bonding agent consisting of:

Parts by weight
Polyamide (solid) _____ 28
Solvents:
    Methyl alcohol _____ 70
    Benzene _____ 20
    Water _____ 10 and passed into a squeezing device consisting of two rolls spaced 0.5 mm. apart. The access solution was squeezed off until a wet pickup of 100%. After leaving the roll nip, the impregnated fiber web expanded to 30% of the original volume and was subjected for 12 minutes to a drying process at 115° C. The content of binder, calculated on the weight of the dry original web mat was 28%, the final fiber mat had a specific gravity of 0.036, a thickness of 12 mm. (which therefore had dropped to 33% of the value it had before the thorough impregnation). The compressibility under a load of 10 kg. per square meter is not measurable. The air resistance at an air velocity of 1.5 meters per second is 2.8 mm. water column.

EXAMPLE 2

The web or fleece is produced from polyamide fibers in the same way as in Example 1, the impregnation and drying being also the same.

The fiber web, prestabilized on one side as in Example 1, is thoroughly impregnated with a binder having the following composition:

Parts by weight
Hexamethylolmelamine _____ 55
Diammoniumphosphate _____ 5
Water _____ 23
Methyl alcohol _____ 17

Squeezing out is effected by a pair of rolls having a nip of 0.4 mm. until a wet pickup of 120%. The fiber web from which the excess binder has been removed is dried and condensed for 12 minutes at a temperature of 130° C.

The final product has the following properties:

Thickness _____ 17 mm. (47% of the prestabilized web).
Specific gravity _____ 0.028.
Compressibility under a load of 10 kg. per sq. meter _____ Not measurable.
Air resistance at an air velocity of 1.5 meters per second ___ 4.1 mm. water column.

EXAMPLE 3

A fiber web or fleece, consisting of 92 parts of polyester fibers, 60 mm. staple length, 22 denier and 8 parts of polyvinyl chloride fibers, 40 mm. staple length, 3 denier, weight of fiber web 250 grams per square meter, is subjected for 6 minutes to a temperature of 115° C. and in this manner prestabilized sufficiently throughout by shrinkage of the polyvinyl chloride fibers so that impregnation by a squeezing device is made possible. The fiber web prestabilized in this manner is impregnated with a binder solution of the following composition:

Parts
Triphenylmethanetriisocyanate 4,4',4" in a solution of methylenechloride, concentration 20% _____ 316
Polyester of 3 mol adipic acid, 3 mol butyleneglycol and 1 mol glycol, sold as "Desmophene 800," in a solution of trichloroethylene concentration 50% _ 200

The fiber web is freed from the excess by a pair of rolls (roll nip 0.4 mm.). The wet pick-up is 100%. The impregnated fiber web expands to a web thickness of 28 mm. and is now subjected to drying at 15° C. for 12 minutes. The product has the following properties:

Thickness _____ 17 mm.
Specific gravity _____ 0.019.
Compressibility under a load of 10 kg. per sq. meter _____ 4%.
Air resistance at an air velocity of 1.5 meters per second ___ 2.1 mm. water column.

EXAMPLE 4

A fiber fleece, consisting of 380 grams per square meter sheep's wool, Type B, web thickness 80 mm., is pre-stabilized on one side as in Example 1. The web pre-stabilized in this manner is impregnated with a solution as in Example 1, and fed to a squeezing device consisting of two rubber rolls; the wet pickup is 80%. The impregnated fiber web expands after leaving the squeezing device to a thickness of 33 mm. and is dried at 115° C. for 12 minutes. The product has the following properties:

Thickness _____ 33 mm.
Specific gravity _____ 0.014.
Compressibility under a load of 10 kg. per sq. meter _____ 10%.
Air resistance at an air velocity of 1.5 meters per second ___ 4.8 mm. water column.

EXAMPLE 5

A fiber web or fleece, consisting of 250 grams per square meter spun rayon viscose, 60 mm. staple length 22 denier and 60 mm. thickness, is uniformly mixed during the carding with 50 grams of polyethylene powder and thereupon subjected to a temperature of 125° C. The polyethylene powder introduced, due to its plasticity at the existing temperature, effects a slight bonding together of the fibers. The fiber web which is in this way slightly stabilized through and through has a thickness of 55 mm. and is now subjected to the impregnation process, with the solution used in Example 1. The excess binder is squeezed out by a pair of rolls. The nip is 0.4 mm., and the wet pickup 80%. The impregnated web is thereupon dried for 12 minutes at 115° C. The product has the following properties:

Thickness _____ 50 mm.
Specific gravity _____ 0.007.
Compressibility under a load of
  10 kg. per sq. meter _____ 6%.
Air resistance at an air velocity
  of 1.5 meters per second ___ 2.1 mm. water column.

EXAMPLE 6

A fiber web or fleece, consisting of 150 grams per square meter polyamide fibers, 15 denier, 60 mm. staple length is stabilized on one side as in Example 1, by the application of a covering foam. Upon introduction into the impregnating solution a similar web is fed to it in such a manner that the two pre-stabilized sides lie on the outside. The weight of this combined web is then 300 grams, the thickness 36 mm. The impregnating and squeezing are affected as in Example 1. The product has the following properties:

Thickness _____ 12 mm.
Specific gravity _____ 0.033.
Compressibility under a load of
  10 kg. per square meter ____ 3%.
Air resistance at an air velocity
  of 1.5 meters per second ____ 3.0 mm. water column.

The product differs from that of Example 1 solely by the fact that it has a surface pre-stabilized on *both sides*.

We claim:

1. Self-sustaining highly porous regenerable thermoplastic fiber mat having a specific gravity between 0.007 and 0.05 and a thickness of at least 4 mm. and an air permeability which is less than 5 mm. water column at a speed of streaming air of 1.5 meters per second even after prolonged use and in which the fibers are bonded together at their crossing points in any part of said mat with the same strength so that solid particles incorporated in the fiber mat may be removed by washing with water.

2. Self-sustaining highly porous regenerable thermoplastic fiber mat according to claim 1, wherein said bonding together of said thermoplastic fibers at their crossing points is effected by an adhesive selected from the group consisting of polyamide, hexamethylolmelamine, triphenylmethane-triisocyanate 4,4',4'', diisocyanate, and urea-formaldehyde condensation products.

3. Self-sustaining highly porous regenerable thermoplastic fiber mat according to claim 2, wherein the content of said binder amounts to 28% calculated on the weight of the dry mat.

4. Self-sustaining highly porous regenerable thermoplastic fiber mat according to claim 1, wherein said thermoplastic fibers are bonded together at their corresponding points, the interstices between adjacent fibers being open and substantially unfilled by binder.

5. Self-sustaining highly porous regenerable thermoplastic fiber mat which can be employed in filtering operations having a specific gravity between 0.007 and 0.05 and a thickness of at least 4 mm. and an air permeability which is less than 5 mm. water column at a speed of streaming air of 1.5 meters per second even after prolonged use and in which the fibers are bonded together at their crossing points in any part of said mat with the same strength, so that dust particles incorporated in the fiber mat may be removed by washing with water.

6. Self-sustaining highly porous regenerable thermoplastic fiber mat which can be employed in scouring, stripping, and abrasive operations without leaving undesirable residue and which is capable of being readily cleaned having a specific gravity between 0.007 and 0.05 and a thickness of at least 4 mm. and an air permeability which is less than 5 mm. water column at a speed of streaming air of 1.5 meters per second even after prolonged use and in which the fibers are bonded together at their crossing points in any part of said mat with the same strength, so that solid particles incorporated in the fiber mat may be removed by washing with water.

References Cited

UNITED STATES PATENTS

| | | | |
|---|---|---|---|
| 2,879,197 | 3/1959 | Maskat et al. | 156—79 |
| 2,972,554 | 2/1961 | Maskat et al. | 156—79 |
| 2,353,937 | 7/1944 | Smith | 55—524 |
| 2,734,841 | 2/1956 | Merriman | 161—157 X |
| 2,719,598 | 10/1955 | Lindner | 55—524 X |
| 2,339,562 | 1/1944 | Eustis | 161—170 X |
| 2,958,593 | 11/1960 | Hoover et al. | 51—295 |

WILLIAM D. MARTIN, *Primary Examiner*.

MURRAY KATZ, *Examiner*.

R. HUSACK, *Assistant Examiner*.